United States Patent
Seppä et al.

(10) Patent No.: US 8,955,751 B2
(45) Date of Patent: Feb. 17, 2015

(54) METHOD AND DEVICE FOR IDENTIFYING AN ELECTRONIC CODE

(75) Inventors: Heikki Seppä, Espoo (FI); Hannu Sipola, Espoo (FI); Anssi Rautiainen, Espoo (FI); Panu Helistö, Espoo (FI)

(73) Assignee: Nicanti Oy, Helsinki (FI)

( * ) Notice: Subject to any disclaimer, the term of this patent is extended or adjusted under 35 U.S.C. 154(b) by 1079 days.

(21) Appl. No.: 12/992,053

(22) PCT Filed: May 14, 2009

(86) PCT No.: PCT/FI2009/050398
§ 371 (c)(1),
(2), (4) Date: Dec. 29, 2010

(87) PCT Pub. No.: WO2009/138571
PCT Pub. Date: Nov. 19, 2009

(65) Prior Publication Data
US 2011/0101098 A1    May 5, 2011

(30) Foreign Application Priority Data

May 15, 2008  (FI) .................................. 20085456

(51) Int. Cl.
| | |
|---|---|
| *G06K 7/08* | (2006.01) |
| *G06K 19/00* | (2006.01) |
| *G06K 19/06* | (2006.01) |
| *G06K 19/067* | (2006.01) |

(52) U.S. Cl.
CPC ................................... *G06K 19/067* (2013.01)
USPC ............................ 235/451; 235/487; 235/492

(58) Field of Classification Search
CPC ....... G06K 19/06; G06K 19/067; G06K 1/00; G06K 1/12; G06K 1/121
USPC .......... 235/440, 441, 451, 492, 375, 487, 494
See application file for complete search history.

(56) References Cited

U.S. PATENT DOCUMENTS

| | | | |
|---|---|---|---|
| 4,303,885 A | | 12/1981 | Davis et al. |
| 4,727,322 A | | 2/1988 | Lonchampt et al. |
| 4,799,011 A | | 1/1989 | Muller |
| 5,017,869 A | | 5/1991 | Oliver |
| 5,159,181 A | | 10/1992 | Bartels et al. |
| 5,213,190 A | | 5/1993 | Furneaux et al. |
| 5,471,039 A | * | 11/1995 | Irwin et al. .................... 235/441 |

(Continued)

FOREIGN PATENT DOCUMENTS

| | | |
|---|---|---|
| CA | 2049934 | 7/1991 |
| CN | 1227924 | 9/1999 |

(Continued)

*Primary Examiner* — Thien M Le
*Assistant Examiner* — April Taylor
(74) *Attorney, Agent, or Firm* — Muncy, Geissler, Olds & Lowe, P.C.

(57) ABSTRACT

A method and device for reading an electronic code. An alternating electrical signal is brought to the code being measured with the aid of electrodes, and the current or voltage travelling through the electrodes is measured. The real and the imaginary components of the current or correspondingly the voltage are defined. The electrodes, being on an essentially lossless surface, an angle correction is made to the real and imaginary components of the current or the voltage in such a way that substantial changes in the current take place only in the imaginary component of the current or voltage.

18 Claims, 5 Drawing Sheets

(56) References Cited

U.S. PATENT DOCUMENTS

| | | | | |
|---|---|---|---|---|
| 5,475,205 | A | * | 12/1995 | Behm et al. .................. 235/375 |
| 5,599,046 | A | * | 2/1997 | Behm et al. .................. 283/83 |
| 5,621,200 | A | * | 4/1997 | Irwin et al. .................. 235/375 |
| 5,818,019 | A | * | 10/1998 | Irwin et al. .................. 235/375 |
| 6,202,929 | B1 | * | 3/2001 | Verschuur et al. ....... 235/462.25 |
| 2006/0138233 | A1 | * | 6/2006 | Kemppainen et al. ........ 235/451 |
| 2007/0084934 | A1 | * | 4/2007 | Seppa .......................... 235/492 |

FOREIGN PATENT DOCUMENTS

| | | |
|---|---|---|
| DE | 102 04 035 A1 | 8/2003 |
| DE | 103 16 191 B3 | 7/2004 |
| EP | 1008114 | 6/2000 |
| EP | 1 172 772 A2 | 1/2002 |
| FI | 20031089 | 7/2003 |
| WO | WO 9641278 | 12/1996 |
| WO | WO-2004/037560 A2 | 5/2004 |
| WO | WO-2005/008574 | 7/2004 |

* cited by examiner

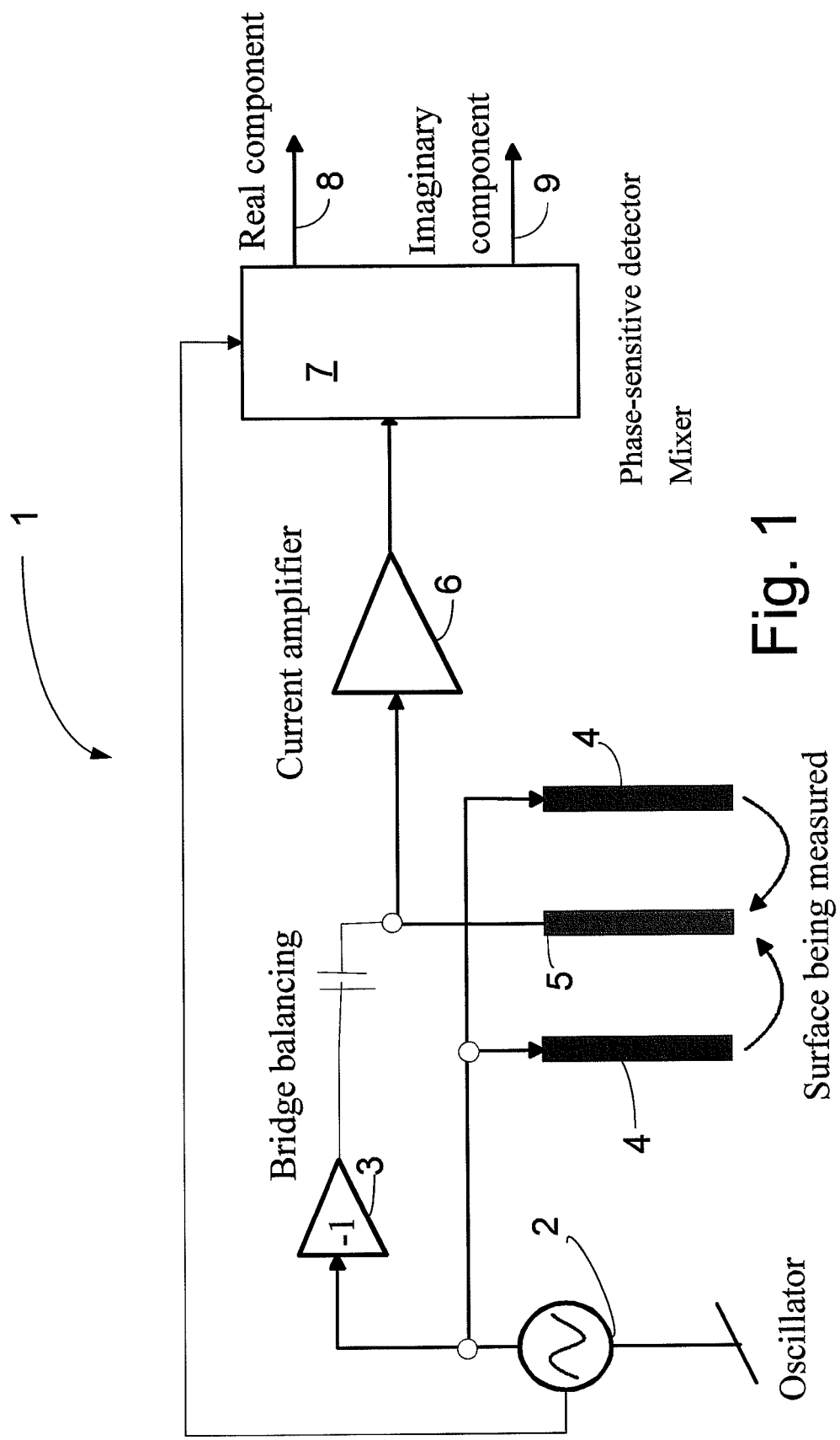

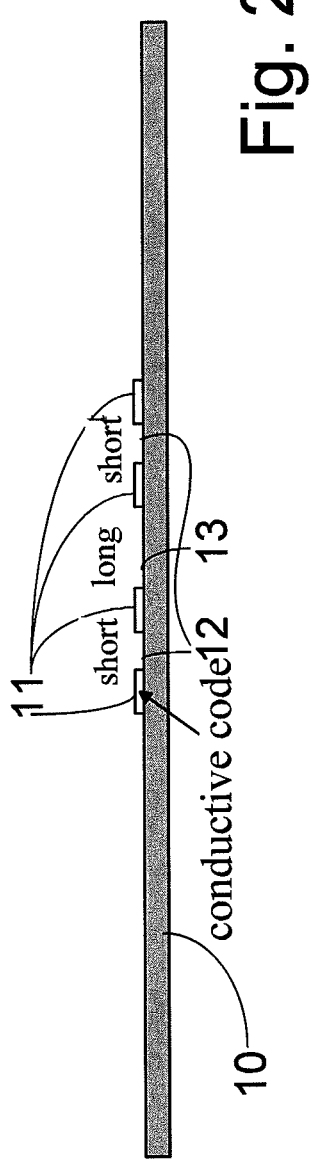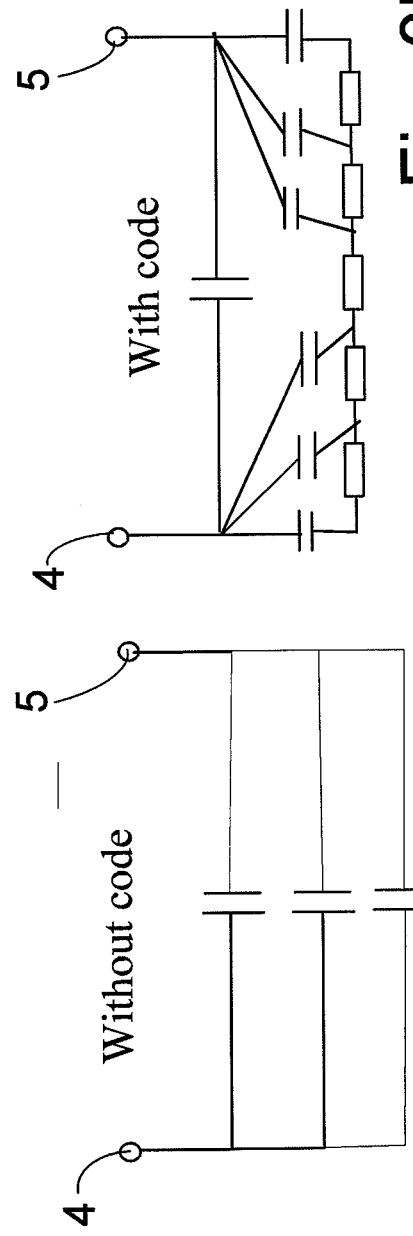

METHOD AND DEVICE FOR IDENTIFYING AN ELECTRONIC CODE

The present invention relates to a method, according to the preamble of claim 1, for detecting an electronic code.

The invention also relates to an apparatus intended to apply the method.

According to the prior art, both optically readable barcodes and also remotely readable RFID identifiers are used in freight traffic.

Barcodes have the advantage of a standardized technology, but this technology requires a visible mark and also a reading technique that takes place at least at sight distance, which restricts the use of the application. The visible mark makes the technology susceptible to abuse.

RFID technology has many advantages over the aforementioned barcode technology, including remote readability and the possibility to hide the code entirely in a product, which can be used to prevent the counterfeiting of codes. However, the identifiers used in the technology are clearly more expensive than the barcode technology.

U.S. Pat. No. 5,818,019 discloses a solution, in which a reading device is used to measure capacitively verification resistance markings assigned a monetary value. The machine allows the measurement to take place contactlessly at a short distance. In the measurement, the orders of magnitude of several (for example, 8 items) resistors are determined by simultaneous measurement, in such a way that the resistance value of each resistor should be within specific predefined limits. The matter is thus one of using a 'digital technique' to estimate the electrical correctness of a lottery ticket. If all the resistors are within the predefined limits, the ticket is accepted, while even a single deviation will cause a rejection.

The invention is intended to eliminate the defects of the state of the art described above and for this purpose create an entirely new type of method and apparatus for reading an electronic code.

The invention is based on forming the code from several conductive lines, from which both a real and an imaginary part is electronically determined with the aid of electrodes, and, the electrodes being on an essentially lossless surface, an angle correction is made to the real and imaginary parts of the current, in such a way that substantial changes in current take place only in the imaginary part of the current.

According to one preferred embodiment of the invention, the measured real and imaginary parts are corrected by an angle correction, in such a way that the real part principally measures losses.

More specifically, the method according to the invention is characterized by what is stated in the characterizing portion of claim 1.

For its part, the apparatus according to the invention is characterized by what is stated in the characterizing portion of claim 12.

Considerable advantages are gained with the aid of the invention.

The invention provides a clear advantage in relation to a barcode, thanks to its invisibility. The invisible code can be used to ascertain counterfeit products, among other things, easily and cost-effectively.

In practice, the applications of the invention are similar to those of RFID technology and barcode technology. The code according to the invention can be either visible or hidden under a non-transparent protective membrane. The code according to the invention can be used, for example, in access-control applications, product-data coding, authentication, and verification of the origin of a product.

In relation to electronically readable RFID tags, the invention, for its part, offers a considerable cost advantage, because the code can be manufactured using a printing technique.

Thanks to the optimization of the electrical properties of the marking, the measuring electronics can be manufactured from more inexpensive components.

In the following, the invention is examined with the aid of examples and with reference to the accompanying drawings.

FIG. 1 shows one measuring device according to the invention.

FIG. 2 shows one measurement object according to the invention.

FIG. 3a shows the equivalent circuit between the electrodes of the measuring device according to the invention, when there is no code to be read between the electrodes.

FIG. 3b shows the equivalent circuit between the electrodes of the measuring device according to the invention, where there is a code to be read between the electrodes.

Figure 4:
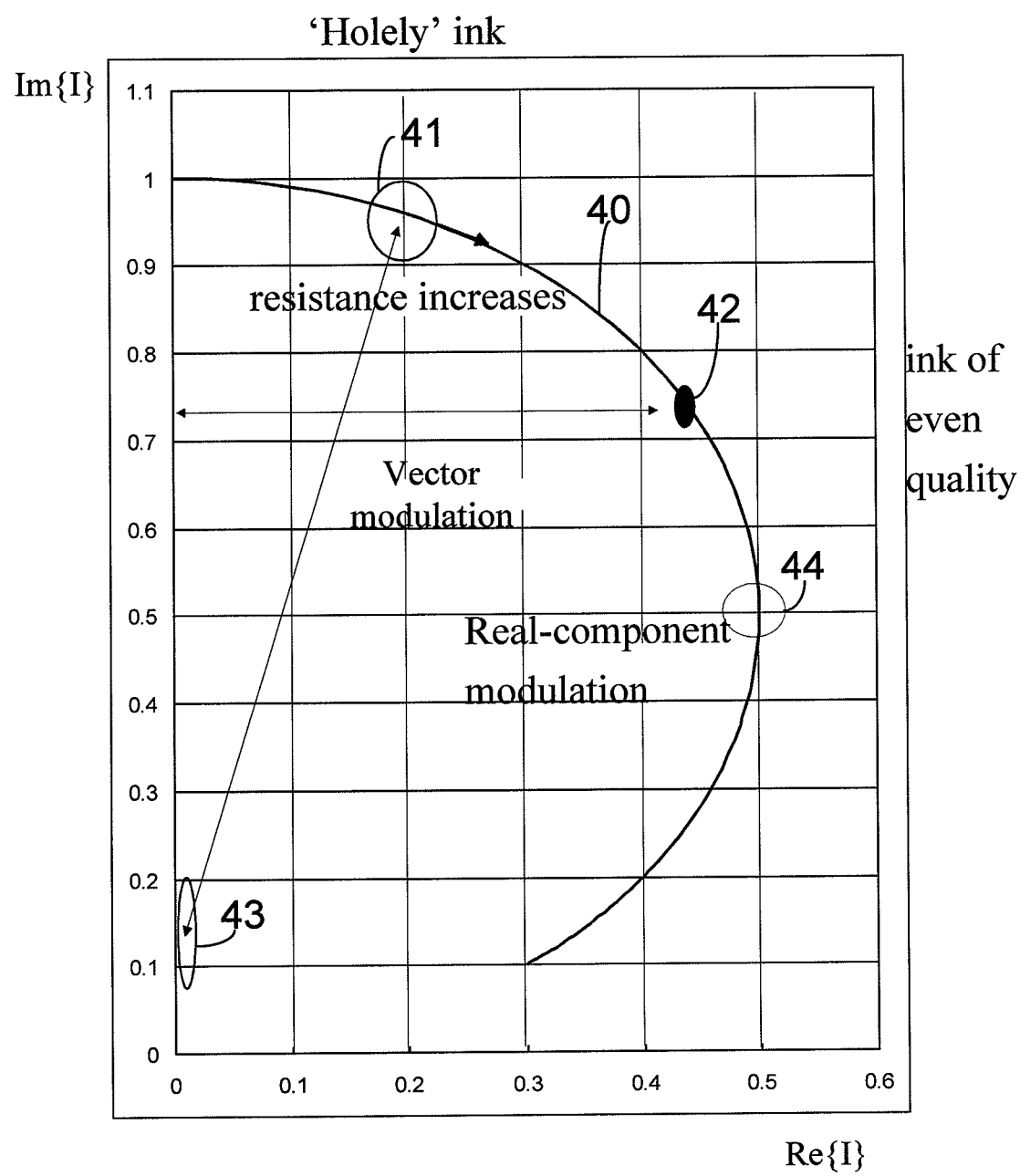
FIG. 4 shows graphically, from the point of view of the measuring device according to the invention, the behaviour of the real component and the imaginary component of a marking to be read, as the code resistance increases.

FIG. 1 shows the measuring device 1, in which two live electrodes 4 fed by an oscillator 2 activate a current, which travels through the surface being measured and possibly a conductive structure in it. In the arrangement according to the figure, the middle electrode 5 is used to measure the signal. The capacitance (CMOS or JFET) of the wiring and amplifier 6 is generally so great, that the impedance of the reading electrode 5 represents a capacitive short circuit. If this is not the case, current feedback can be arranged to the amplifier 6, which makes the amplifier's input extremely low-impedance. The signal is detected by using phase-sensitive detection 7, which is based on mixing the signal down with alternating electricity connected in phase with the object and the signal is phase-displaced through 90 degrees. If the measurement is not differential, the capacitive connection between the conductors is cancelled with a counter-phase signal, in order to balance the bridge. The circuit according to the arrangement of the figure measures the imaginary component 9 and real component 8 of the admittance of the surface.

FIG. 2 illustrates a situation, in which conductive (non-transparent) codes 11 are formed on top of a base 10. The base 10 can be paper, board, plastic, or some other similar, typically non-conductive surface. In the figure, the coding has been made in such a way that the width of the code 11 is constant, but the distance between the codes is modulated. Thus, in the code there are short gaps 12 and long gaps 13 between the conductive structures 11. In some situations, there is a thin plastic film on top of the code 11, which reduces the capacitive connection to the object.

If the code according to FIG. 2 is scanned with an arrangement according to FIG. 1, the admittance will vary in principle between two values. The electrical circuit of FIG. 3a depicts a situation, in which the object being measured is purely paper and in FIG. 3b correspondingly a situation, in which there is an electrically conductive layer on top of a base 10. Because the field is divided, an accurate model requires us to depict the situation using several capacitors and a resistor. If there are several conductive structures on the surface over which scanning takes place, we create an admittance modulation. In this case, when measuring at a single frequency, an impedance measurement produces an imaginary and a real component of the admittance of the object. In terms of measurement, the important question is what is the fluctuation of the imaginary and real components of the admittance, compared to a situation, in which the code alters both the real and the imaginary component. The central idea of the present invention is how to perform the measurement, so that we will be able to maximize the signal-noise ratio of the measurement.

If we assume that the noise of the electrical resistance of the object is not substantial, in terms of the electronics an attempt is made to maximize the current of the real or imaginary component. This is achieved by maximizing the capacitive connection to the object, by making wide electrodes and a wide code and by minimizing the distance of the code from the measuring electrodes. However, at high frequencies the noise of the object often determines the signal-noise ratio, and not at all the noise of the electronics. The noise often arises from the 'hunting' and tilting of the reader and the roughness of the paper (the object). Because most bases are not conductive, the problems cause noise mainly only in the imaginary component of the admittance. Though the surface has losses to some extent, the noise of the real component always remains smaller than the noise of the imaginary component. Noise can also arise on top of the code. If the code is highly conductive, but the ink remains 'splotchy', among others, because of the roughness of the paper, the problem will be that, on top of the code, both the imaginary component and the real component will be noisy. The real component can also remain very small, because the electrical current travels from the input electrode to the measuring electrode only over well conducting bridges.

To examine the matter first of all somewhat mathematically. If we assume a simple equivalent circuit for the object, in which the series connection of the capacitor and the resistor depict the impedance in a situation when the reading head is on top of the code. Outside the code, the object is almost entirely lossless, so that it can be depicted by only a capacitor. The current received by the electronics can be obtained by the equation $$I = U\omega C \frac{(r+j)}{r^2+1}, \text{ where } r = \omega CR \quad (1)$$

First, it will be noted that the current can be maximized by using the highest possible frequency and by attempting to measure the conductive code from as close as possible—by creating a large capacitance.

FIG. 4 shows graphically, with the aid of a curve 40, the behaviour of the real component and the imaginary component of the measured admittance, when the resistance increases. The figure is a standardized presentation, in which the measurement distance is constant, thus the capacitance has a constant magnitude. In addition, an ellipse 43, which depicts the admittance without the code, is drawn in the figure. It will be noted, that the modulation of the real component maximizes when r=1 at point 44, where the imaginary component and real component of the measured admittance are of equal magnitude, in which case the real and imaginary components of the measured impedance are naturally also of equal magnitude. An imagined situation (the black ellipse 42), in which the good-quality conductive surface is measured, is also drawn in the figure. The circle 41 shows a situation, in which a 'holey' code is measured, in which case the variations of both the real component and the imaginary component are very large. When using an insulating base material, the value of the real component and its fluctuations are small, so that it is best to select the distance and the conductivity of the ink in such a way that r=1 and thus we maximize the signal-noise ratio of the real component of the admittance. When the resistance increases to infinity, the curve approaches the ellipse 43.

The method is essentially based on separating the real component and the imaginary component of the admittance of the object from each other. At high frequencies, and especially when using a square wave, there is no accurate information on the so-called angle error. With a square wave, which contains high harmonics, the entire concept of a real component and an imaginary component is, in a way, wrong. According to one embodiment of the invention, the important fact is that the following angle-correction equations are directed to the measured real and imaginary components $$Re\{Y_u\}=Re\{Y\}\cos\alpha+Im\{Y\}\sin\alpha \text{ and}$$

$$Im\{Y_u\}=-Re\{Y\}\sin\alpha+Im\{Y\}\cos\alpha \quad (2)$$

The sub-index u relates to the angle-corrected admittance. The correction angle is marked by $\alpha$. The basic idea of the method is that the correction angle is chosen in such a way that the variation of the real component is minimized, when the measuring device is scanned over the surface of the paper (plastic) at a point at which there is no code. Calibration can be improved by intentionally making impressions on the surface of the paper, or by swinging the measuring point (pen) in such a way that the distance from the surface of the paper varies. It is preferable to make the calibration on the surface used in the embodiment. Another alternative is to make the calibration for the angle when scanning the code in an area, in which there is no code. When such a codeless, lossless surface is scanned by the measuring point, in principle only the lossless measuring component changes. This means that the angle can be found in such a way that the change in the real component of the admittance is minimized. If the angle is selected in such a way that the placing of the point on the paper does not affect the real component of the angle, the noise of the real component too is minimized. In practice, the calibration of the angle must be made only once, if the reading frequency is not changed. Whether or not a separate independent calibration must be made for each measuring point depends on variations in the manufacture of the electronics.

The intention of the angle correction is thus to eliminate from the measurement signal the variation due to changes in the properties of the paper and the position of the point and make it depend only on the properties of the code. The background noise is removed.

In the angle correction, the angle of rotation of the set of co-ordinates is selected in such a way that a change in the lossless dielectric material in the object does not appear in the angle-corrected Re signal.

This objective is achieved by producing for the measuring point a change only in lossless permittivity, for example, by lowering the point onto the paper. After this, the angle-corrected signals Re and Im are examined. The angle alpha is adjusted until a change caused by the adjustment appears only in the Im signal, or the minimum of the Re signal is reached.

After the correction, the Re signal is measured, in which the change will appear only at the code.

Figure 5:
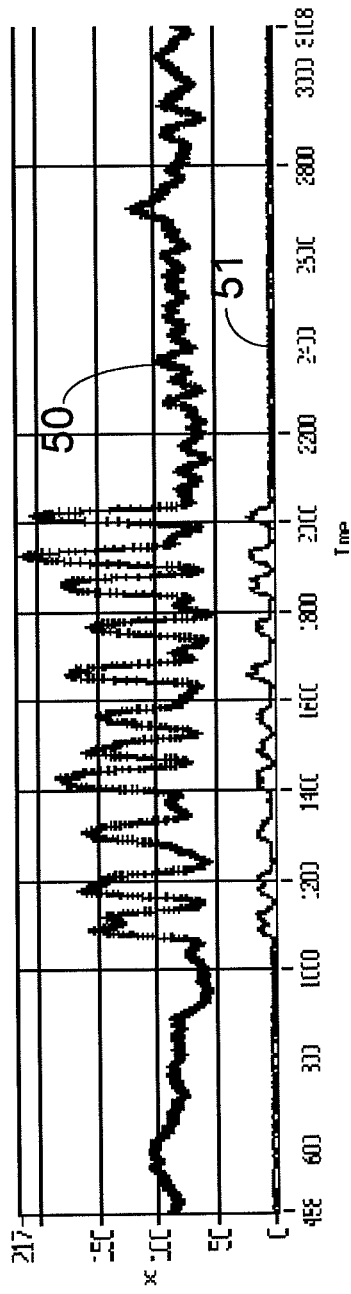
FIG. 5 shows graphically the measuring device according to the invention after the angle correction of the first measurement results, in which the real component is the lower curve and the imaginary component the upper curve.

FIG. 5 shows a test, in which an admittance point operating at 50 MHz scans the code through thin plastic. It will be noted that, even though the imaginary component 50 is clearly stronger than the real component 51, the noise of the imaginary component 50 is very great. This is caused by the roughness of the paper. Before the scanning of the code, the real component 51 is measured and the imaginary component 50 was corrected by an angle correction of about 28 degrees. Without the angle correction, both components would be mainly determined by the capacitance modulation.

Figure 6:
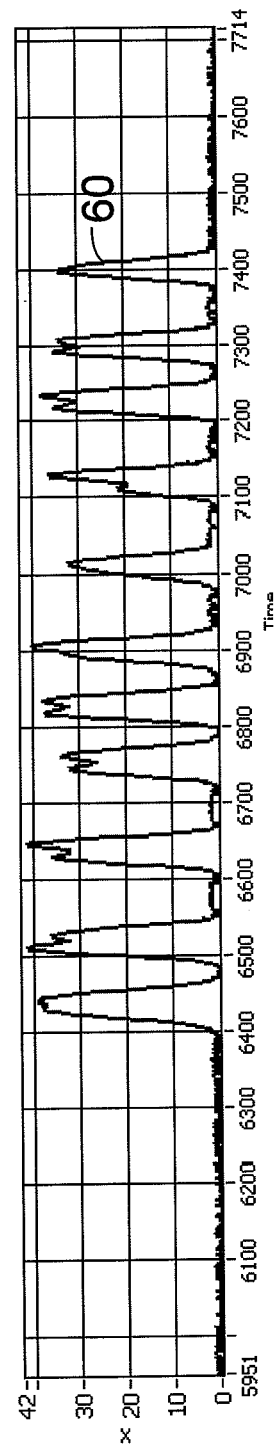
FIG. 6 shows the real component of the admittance after angle correction.

FIG. 6 shows only the real component 60 of the admittance. Though in the case in question the conductivity of the code is not optimized, the real component's signal-noise ratio is very good. In fact, in this measurement the noise on top of the paper is determined by the digitization used. A small amount of noise is caused by the fact that we can set the triggering level close to the zero point of the real component, so that even a poor code can be read.

Figure 7:
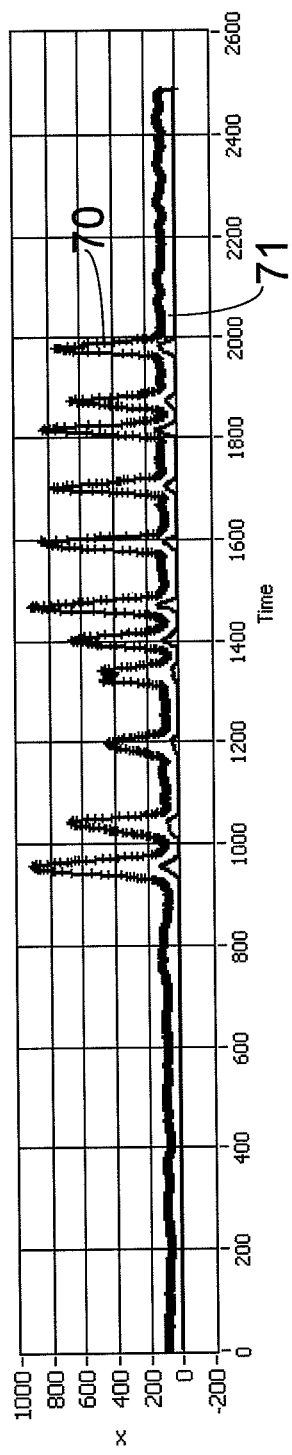
FIG. 7 shows measurement results of a poor-quality code read by the measuring device according to the invention.

FIG. 7 shows a special case, in which the code is read from very close, but due to the roughness of the paper the code has become 'splotchy'. Because in this special case the ratio of the real component 71 to the imaginary component 70 is not optimal, the real component 71 remains considerably smaller than the imaginary component 70. On the other hand, because the code has become 'splotchy', both are noisy on top of the code. In such a situation, it is best to include the imaginary component too in the measurement. This situation is shown in FIG. 4, where both noises are assumed to be great on top of the code.

It should be noted that in these measurements the conductivity of the code has been too great and, because of this, the signal obtained from the imaginary component has been dominant.

Figure 8:
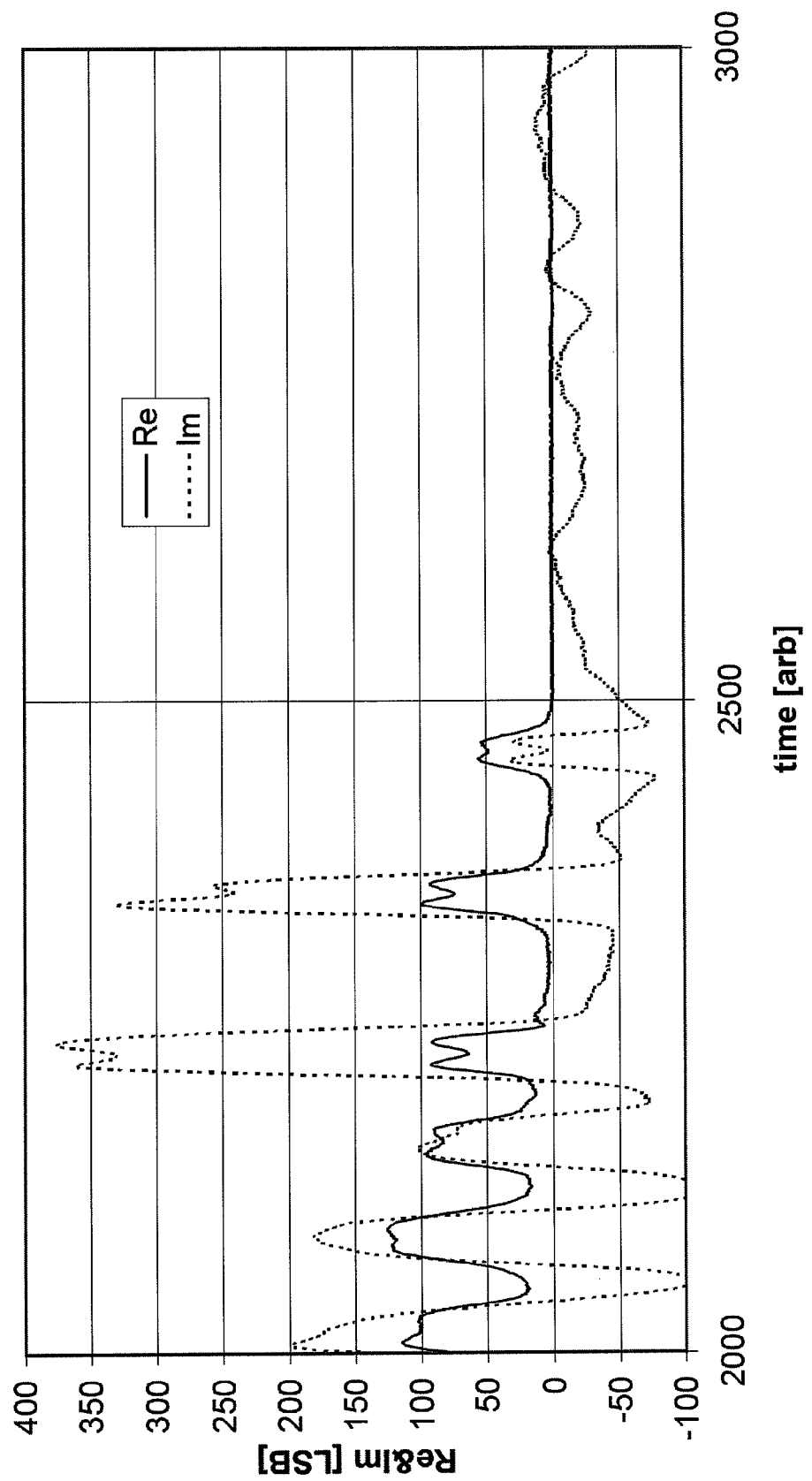
FIG. 8 shows measurement results of a code read by the measuring device according to the invention, divided into an imaginary and a real component.

FIG. 8, for its part, represents a typical measuring situation, in which the broken line depicts the imaginary component, and the completely solid line the real component of the measured impedance. As can be seen from the figure, the signal-noise ratio of the real component is clearly better than the signal-noise component of the imaginary component.

One central idea of the method is to calibrate the pen acting as the measuring head, in such a way that it distinguishes the real component and the imaginary component from each other. This can be done by adjusting the correction angle in such a way that the pen produces no changes in the real component when it is placed on a lossless dielectric surface. Another way is to scratch the dielectric surface and ensure that fluctuations do not take place in the real component when scanning over the surface. In a practical measuring situation, the real component is reset on the surface of the paper and the triggering level is set beforehand, or the algorithm seeks a suitable triggering level on the basis of the signal strength. Because the noise in the real component is small, the triggering level can be set very close to zero. Only in a situation, in which the conductivity of the code is dimensioned wrongly, or the code is 'splotchy', is it worth using the longitudinal modulation of the vector instead of the modulation of the real component. In principle, taken generally, the code can be detected by weighting the lengths of the real component and the imaginary component in a suitable ratio to each other, in such a way that the signal-noise ratio is optimized.

In principle, we can measure the correct conductivity of the code from the real and imaginary components of the admittance. The depiction is mathematically very difficult, because the field is divided. The depiction depends on the mean distance of the pen, the width of the code compared to the width of the electrodes, etc. If, however, we calibrate the pen for a specific application, we can experimentally (or numerically using FEM computation) seek the representation $$r = f\{Re\{Y\}, Im\{Y\}\} \quad (3)$$

in such a way that the change of the variable r on top of and outside of the code is independent of small variations in distance. This is simply due to the fact that both terms are proportional to the distance, so that by using both variables we can eliminate the changes in distance. It should be noted that the method in question does not measure the absolute resistivity of the code, but instead is proportion to the difference in the resistivities of the of the code and the paper. Such a more accurate measurement of conductivity is important, if we are measuring the sensor information. However, we can return the measurement of the sensor information to the measurement of the real component, if, in addition to measurement lines, we place reference lines in the code, the conductivity of which is known, or if its value is given in connection with the code information. In this case, we can calculate the resistance value r of the resistivity of the sensor from the equation from the real and imaginary components of the admittance Y $$r_a = r_{ref} \frac{Re_a(Y)}{Re_{ref}(Y)} \frac{Re_{ref}(Y)^2 + Im_{ref}(Y)^2}{Re_a(Y)^2 + Im_a(Y)^2} \quad (4)$$

In the equation, the sub-index ref refers to the measurement of the reference code and the sub-index a to the measurement of the sensor. Of course, the equation can be used reliably only if the reference has a geometry that is similar to that of the sensor. If either the real component or the imaginary component dominates the admittance, the equation if, of course, simplified. On the other hand, it often happens that the imaginary component is nearly the same on top of both the reference and the sensor, and for this reason the rough conductivity of the sensor is often obtained by simple mathematics. It should be noted that, in equation 4, the admittance Y depicts the angle-corrected admittance.

The code can be made in several different ways. One possibility is to 'copy' the method used in barcodes. Here, however, a way is introduced, which permits a natural way to eliminate the speed variations that take place in scanning with a pen or mouse. In addition, the way described is based on the triggering level being set close to the impedance of the paper and thus not using the code as a 'zero reference'. In the code of FIG. 2, the information is stored in the width modulation of the lines and the width of a conducting line is constant. If we divide the number of samples, which accumulate during the time of the code (non-conducting material) and we divide this with a number, which is either the maximum of the conducting codes close to the number of samples, or by the mean of the number of accumulated samples from the conductive areas nearby, we will obtain standardized code information, which depicts the distance of two lines from each other to the width of the adjacent lines. This number is independent of speed. On the other hand, using a known code and a fixed triggering level, the ratio between a long code and a short code is constant and this permits the detection or erroneous readings. This type of coding also has the advantage that, if the width of the line is minimized, there is more pure paper than code in the surface being read and we can keep the code less visible. Over a long period of time with good material we can possibly even achieve a 40-μm wide line, in which case the visibility of the code will be further reduced. The width of a suitable short code is of the same order as the width of a conducting area and correspondingly a wide gap can be 1.5-3 times wider, depending on the signal-noise rate of the reading and the selected error-correction algorithm. If the coefficient is only 1.5, we obtain an information density of 1/2.25 bits per unit of travel. For example, a 40-1 µm line would conduct 1/90 bit/µm, i.e. a 96-bit EPC code would require a code about 9-mm long. In practice, a pleasant scanning length with a pen-like point is 3 cm-5 cm, so that an EPC code would require a code width of at least 250 µm. Even longer distances can be scanned with a pen and, especially if we use a mouse-type interface, the distance can easily be 5 cm-10 cm. This means that even large numbers of bits can be coded electronically. In addition, if a 2D code is made from a corresponding method, the amount of information can be many times this.

According to one embodiment of the invention, the reading of the code can thus be optimized as follows. Once the electrode structure, the distance from the code, and the reading frequency are settled, the conductivity of the ink is optimized, in such a way that the reactance of the capacitance is of the same order as the resistance of the conductive ink. With the aid of the measuring electronics, the measured real and imaginary components of the admittance are corrected by angle correction, in such a way that the real component measures only losses. This can be seen easily by bringing the point close to the non-conductive dielectric surface. The correction can be analog in connection with a capacitive bridge, or after mixing. The correction can also be made digitally, after AD correction. After the angle correction, the interpretation of the code is made mainly from the real component. If, for example, due to the examination of the origin of the ink we require better information on the conductivity, we can, with the aid of the admittance, calculate the real component of the impedance and decide the conductivity of the code from this.

The invention can also be described as follows. The permittivity of the dielectric material being measured (paper, board, plastic) is complex, containing a lossy and a lossless component. The reader according to the invention measures both of these. The lossless component is formed of polarization. The lossy component is formed either of the losses relating to polarization, or of conductivity losses. The permittivity of clean paper is almost entirely lossless.

When moving the point of the reader, which is represented, for example, by the electrodes 5 and 4 of FIGS. 3a and 3b, on the surface of the object being measured (paper, board, plastic) in a place in which there is no code, the signal proportional to the lossless permittivity measured by the point of the reader changes for the following reasons:
1. Due to the fibrous nature of the paper the permittivity varies at different points.
2. The moisture absorbed by the paper changes the permittivity in different ways at different places.
3. When the point tilts, the connection from the point to the paper changes and affects the signal.

There is no signal at all proportional to lossy permittivity.

The signal proportional to this lossless permittivity appears in both angle-corrected signals (Re_orig and Im_orig), which is due to the phase difference between the modulation and demodulation. By altering the correction angle alpha, this phase difference can be altered (also called rotation of the coordinates). By altering the angle, new signals Re and Im can be formed. By means of a suitable angle the signal caused by the variation in lossless permittivity appears only in the Im component. At the same time, it vanishes entirely from the Re signal.

Thus, in practice the angle correction is made by moving the reader on clean paper and adjusting the angle alpha, until the change caused by the movement appears only in the imaginary component, or if changes appear in the real component, they are minimal and very small. In that case, the real component thus measures only the lossy, resistive component of the impedance.

Thus, because there is only the lossy permittivity at the code, the Re signal changes only at the code.

The angle-correction operation described above is typically one-off in nature and need only be made once, or repeated at relatively infrequent intervals (once a month—once a year).

The invention can be implemented using voltage or current input, in which case the voltage input is used to measure the current between the measuring electrodes and the current input is used to measure the voltage between the measuring electrodes. The measuring variables (current or voltage) can be referred to more generally as measuring signals.

Bridge balancing Current amplifier Real component
Imaginary component
Phase-Sensitive Detector
Mixer
Oscillator Surface being measured
FIG. 1
short long short
conductive code
FIG. 2
Without code
FIG. 3a
With code
FIG. 3b
'Holely' ink
resistance increases
ink of even quality
Vector modulation
Real-component modulation
FIG. 4

The invention claimed is:

1. A method for reading an electronic code, in which method
an alternating electrical signal is brought to the electronic code being measured, with the aid of electrodes, and
the current travelling through the electrodes, or the voltage over the electrodes, is measured,
wherein
the real and the imaginary components of the current or correspondingly the voltage are defined,
the electrodes being on an essentially lossless surface, an angle correction is made to the real and imaginary components of the current or correspondingly the voltage, in such a way that substantial changes in the current or voltage take place only in the imaginary component of the current or voltage, and
a measuring frequency of a measuring device, a reading distance of a measuring head from the code, and a resistivity of the code are selected in such a way that the reactance of the capacitance seen by the measuring device is of the same order of magnitude as the resistance of a conductive ink seen by the measuring device.

2. The method according to claim 1, wherein the measurement is implemented as a scanning measurement from contact distance.

3. The method according to claim 1, wherein the code is formed by varying non-conductive areas between conductive code lines.

4. The method according to claim 1, wherein in manual scanning variation in the speed of the scanning is taken into account.

5. The method according to claim 1, wherein, when the current received by the measuring device is depicted by the equation $$I = U\omega C \frac{(r+j)}{r^2+1}, \text{ where } r = \omega CR \tag{1}$$

in which,

R and C depict the resistive and capacitive share of the impedance of the marking being read, a reading distance of a measuring system, the electrical properties of the code, and the measuring frequency are selected in such a way that the condition r=1 is met as precisely as possible.

6. The method according to claim 1, wherein the measuring device is calibrated by adjusting the correction angle, in such a way that a pen does not produce changes in the real component when it is placed on a lossless dielectric surface.

7. The method according to claim 1, wherein the measuring device is calibrated by scratching a dielectric surface, measuring the scratched surface, and adjusting the measuring device in such a way that fluctuations do not occur in the real component of the measurement result when scanning over the scratched surface.

8. The method according to claim 1, wherein in a measuring situation, the real component of the measurement result is reset on a surface of an uncoded material and electronics' triggering level starting the measurement is set beforehand on the basis of the reset real component.

9. The method according to claim 1, wherein, in a measuring situation, an algorithm seeks a suitable triggering level starting the measurement, on the basis of the strength of the signal.

10. An apparatus for reading an electronic code, comprising:
    means for bringing an alternating electric signal to the electronic code being measured, with the aid of electrodes,
    means for measuring the current travelling through the electrodes or the voltage between the electrodes,
    means for defining the real and imaginary components of the current or voltage,
    means for making an angle correction to the real and imaginary components of the current or voltage, the electrodes being on an essentially lossless surface, in such a way that substantial changes of current or voltage take place only in the imaginary component of the current or voltage, and
    means for selecting a measuring frequency of a measuring device, a reading distance of a measuring head from the code, and a resistivity of the code, in such a way that the reactance of the capacitance seen by the measuring device is of the same order of magnitude as the resistance of a conductive ink seen by the measuring device.

11. The apparatus according to claim 10, further comprising means for implementing the measurement from contact distance as a scanning measurement.

12. The apparatus according to claim 10, further comprising means for reading the code by defining a non-conductive areas between conductive code lines.

13. The apparatus according to claim 10, further comprising means for taking into account variation in a speed of scanning in manual scanning.

14. The apparatus according to claim 10, wherein, if the current received by the measuring device is depicted by the equation $$I = U\omega C \frac{(r+j)}{r^2+1}, \text{ where } r = \omega CR \tag{1}$$

in which,

R and C depict the resistive and capacitive share of the impedance of marking being read, the apparatus comprises means for selecting a reading distance of a measuring system, the electrical properties of the code, and the measuring frequency, in such a way that the condition r=1 is met as precisely as possible.

15. The apparatus according to claim 10, wherein the measuring device includes calibration means, by which the correction angle can be adjusted, in such a way that a reading pen of the measuring device does not produce changes in the real component when it is placed on a lossless dielectric surface.

16. The apparatus according to claim 10, further comprising means by which the measuring device can be calibrated by scratching a dielectric surface, measuring the dielectric surface, and adjusting the measuring device in such a way that fluctuations do not occur in the real component of the measurement result when scanning over a scratched surface.

17. The apparatus according to claim 10, further comprising means, in which, in a measuring situation, the real component of the measurement result can be reset on the surface of a code-free material and electronics' triggering level starting the measurement can be set beforehand on the basis of the reset real component.

18. The apparatus according to claim 10, further comprising means, by which, in a measuring situation, a suitable triggering level for starting the measurement can be detected with the aid of an algorithm, on the basis of the strength of the signal.

* * * * *